(12) United States Patent
Mondl

(10) Patent No.: US 7,442,002 B2
(45) Date of Patent: Oct. 28, 2008

(54) TIDAL TURBINE INSTALLATION

(75) Inventor: Fritz Mondl, Petronell (AT)

(73) Assignee: Aqua Libre Energieentwicklungs GmbH, Munderfing (AT)

( * ) Notice: Subject to any disclaimer, the term of this patent is extended or adjusted under 35 U.S.C. 154(b) by 30 days.

(21) Appl. No.: 11/504,784

(22) Filed: Aug. 16, 2006

(65) Prior Publication Data

US 2007/0096472 A1    May 3, 2007

Related U.S. Application Data

(63) Continuation-in-part of application No. PCT/AT2005/00025, filed on Jan. 28, 2005.

(51) Int. Cl.
*F03D 11/04* (2006.01)
*F04D 29/60* (2006.01)

(52) U.S. Cl. ............................. 415/7; 415/3.1

(58) Field of Classification Search ............... 415/4.1, 415/4.3, 3.1, 4.5, 7, 906, 908; 290/42, 53; 60/398
See application file for complete search history.

(56) References Cited

U.S. PATENT DOCUMENTS

| 4,219,303 | A | * | 8/1980 | Mouton et al. ............... 415/7 |
| 5,146,839 | A | | 9/1992 | Glockelmann et al. |
| 5,873,307 | A | | 2/1999 | Tenfelde et al. |
| 6,109,863 | A | | 8/2000 | Milliken |

FOREIGN PATENT DOCUMENTS

| AT | 96377 | 3/1924 |
| AT | 97560 | 7/1924 |
| AT | 170460 | 7/1951 |
| CH | 684430 | 9/1994 |
| DE | 2933907 | 3/1981 |
| DE | 10134509 | 5/2002 |
| GB | 1563337 | 3/1989 |
| JP | 57068563 | 4/1982 |
| JP | 2001132607 | 5/2001 |
| WO | 03056169 | 7/2003 |

OTHER PUBLICATIONS

P. L. Fraenkel, "Power From Marine Currents" in Proc. Instn. Mech. Engrs., vol. 216, No. A1 (2002), pp. 1-14.
English Abstract of CH 684430.
English Abstract of JP 57068563.
English Abstract of JP 2001132607.
English Abstract of WO 03056169.

* cited by examiner

*Primary Examiner*—Edward Look
*Assistant Examiner*—Dwayne J White
(74) *Attorney, Agent, or Firm*—Dykema Gossett PLLC

(57) ABSTRACT

An apparatus for generating electric power in freely flowing rivers includes a housing formed of an outside housing (6) and an inside housing (7) having an outlet (10) formed as a suction pipe, with cavities (17) being provided between the outside housing (6) and the inside housing (7) in order to stabilize the apparatus close beneath the water surface, and with at least one turbine (12) arranged in the inside housing (7) which is flowed through axially and is connected with a generator (14), and with a traction means (2) for anchoring the apparatus. A robust apparatus which is especially protected against hazards caused by high water can be achieved in such a way that the traction means (2) is provided by at least one longer anchor cable (2a), with the anchor cable (2a) being anchored in the used position in an inclined manner in front of the apparatus in the ground of the river, and of at least one shorter rise-limiting cable (2b).

9 Claims, 1 Drawing Sheet

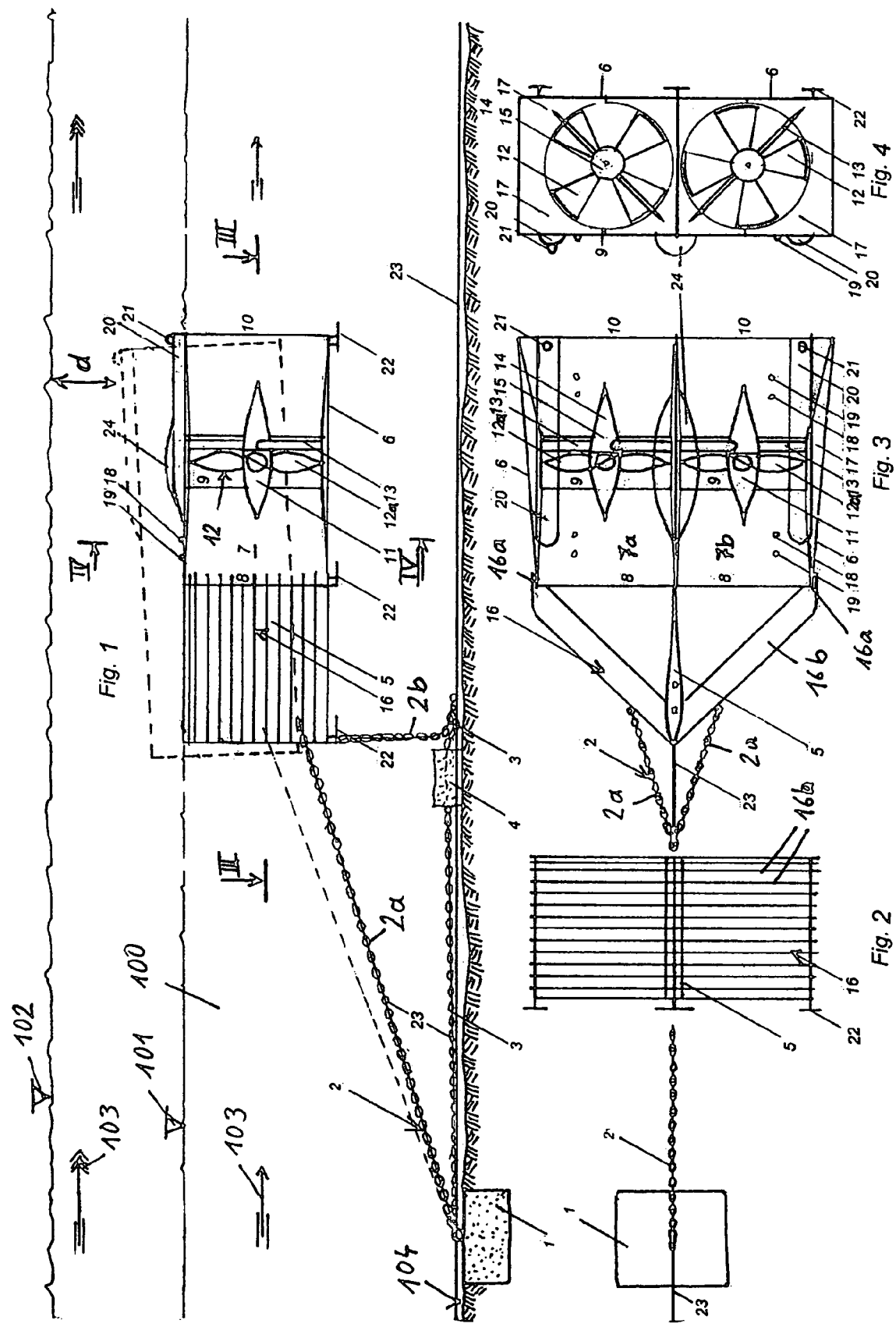

TIDAL TURBINE INSTALLATION

CROSS-REFERENCE TO RELATED APPLICATION

This is a continuation-in-part of International Application PCT/AT2005/000025, filed 28 Jan. 2005, which designated the U.S. All priorities are claimed.

BACKGROUND OF THE INVENTION

FIELD OF THE INVENTION

The invention relates to an apparatus for generating electric power in freely flowing rivers, comprising a housing consisting of an outside housing and an inside housing having an outlet formed as a suction pipe, with cavities being provided between the outside housing and the inside housing in order to stabilize the apparatus close beneath the water surface, and with at least one turbine arranged in the inside housing which is flowed through axially and is connected with a generator, and with a traction means for anchoring the apparatus.

So-called power buoys are known which are suspended in freely flowing rivers in order to generate electric power from the energy of flow of the river. The advantage of such power buoys is that the production expense is very low in comparison with the power that can be generated because no fixed installations such as barrages, weirs or the like are required. Such an apparatus is merely anchored on the ground of the river and electrically connected with a supply point for the generated power.

A relevant apparatus is known from GB 1 563 337 A which substantially consists of a raft or catamaran. Turbines are arranged on its bottom side. This arrangement ensures that the turbine body is always located slightly beneath the water surface, which is relevant for efficiency because the highest flow speed can be expected there. The disadvantageous aspect in this apparatus is the damage by flotsam. A similar apparatus is shown in U.S. Pat. No. 6,109,863 A. Turbines are shown here where the flow occurs transversally to the axial direction.

DE 101 34 509 A further shows a power buoy of the kind mentioned above which is designated here as an underwater power plant in which the turbine housing is connected with an additional floating body via a parallelogram linkage. As a result, the distance of the turbine from the water surface is set depending on the water level, the flow speed and the length of the traction means with which the turbine is connected to the ground of the river. Such an apparatus is complex and it has been observed that the turbine is situated in most cases relatively far beneath the water surface and therefore operates in the suboptimal range.

Further solutions are known from AT 96.377 B, AT 97.560 B, AT 170.460 B, and CH 684.430 A.

It is the object of the present invention to further develop an apparatus of the kind mentioned above in such a way that optimal approaching flow is ensured, but in the case of flooding the likelihood of damage to the apparatus is prevented to the highest possible extent.

SUMMARY OF THE INVENTION

These objects are achieved in accordance with the invention in such a way that the traction means consists of at least one longer anchor cable, the anchor cable is anchored in the used position in an inclined manner in front of the apparatus in the ground of the river, and of at least one shorter rise-limiting cable.

The relevant aspect in the present invention is the fact that in normal operations the turbine is located at optimal level directly beneath the water surface. This optimal level is set by flooding or venting the floating bodies, i.e. the cavities. When the water level is low, the apparatus is held by the anchor cable at the location intended for the same and the rise-limiting cable is loose. When the water level rises, the apparatus rises accordingly with the water level until the rise-limiting cable is tightened at high normal water level. If the water level continues to rise, any further rise of the apparatus is prevented by the now perpendicularly stretched rise-limiting cable. Especially at high water there is a clearly increased likelihood that flotsam such as trees that have been torn away are transported on the water surface. In conjunction with the clearly increased flow speed at high water, this would pose a serious threat to the apparatus if the same were situated directly beneath the water surface. As a result of the rise-limiting means however it is possible to prevent such damage in all probability. It is of special advantage in this connection that as a result of the generally increased flow speed in the case of high water no power losses need to be feared because sufficiently high flow speeds for efficient power generation are available in this case too beneath the water surface. It is optimal in this connection when the rise-limiting cable leads perpendicularly downwards in the used position of the apparatus and is anchored in the ground of the river and/or is loaded by a weight, and that the rise-limiting cable preferably has a length which corresponds to the normal water level of the river.

In order to stabilize the apparatus in the lateral direction as well, it is especially advantageous when two anchor cables are provided which are fastened to the bow of the housing at the same level. An especially simple configuration which offers a possibility for modular expansion can be achieved in such a way that the inside housing comprises a substantially square inlet cross section, a turbine pipe cylinder which is arranged downstream of the same and an adjacent expanding outlet with a rectangular cross section. Increased stability in the flowing river is thus also achieved in this way. As a result of the outlet situated downstream, a diffuser-like effect occurs which increases the efficiency. In this connection it is of further advantage when the outside housing comprises a continuous rectangular cross section which preferably expands towards the downstream side. This measure too is used for stability and efficiency.

An optimal adjustment and alignment of the apparatus in accordance with the invention can be achieved in such a way that the cavities are subdivided in the longitudinal direction and can be filled with water and/or compressed air. This enables a simplified maintenance of the apparatus in particular.

An especially preferred embodiment of the present invention provides an inlet rake at the bow of the housing, which rake consists of a floating body which stands perpendicularly in the used position and extends over the entire height of the housing, and from which extend profiles or cables which are arranged in a V-shaped manner and are fastened to the lateral inlet edges of the housing. It has been seen that such a configuration allows for an outstanding stability of the apparatus, especially about the transversal axis, and simultaneously deflects small and medium-sized flotsam floating against the apparatus without damaging the apparatus. Such flotsam will usually meet the perpendicular floating body which is provided with a respectively robust configuration. The floating body will displace the flotsam to the right or left, which will then slide off the V-shaped arranged profiles on the apparatus. It is of special advantage in this connection that the flotsam will usually not exert any perpendicular forces or moments on the apparatus because they are more difficult to compensate than horizontal forces or moments.

Increased stability can be achieved by additional floating bodies on the upper side of the outside housing.

In order to avoid any damage to the apparatus during extreme low water it is advantageous when spacer feet are provided on the bottom side of the outside housing. They will ensure under all circumstances a sufficient distance from the ground of the river.

The following invention will be explained in closer detail by reference to embodiments shown in the drawings.

BRIEF DESCRIPTION OF THE DRAWINGS

FIG. 1 shows an embodiment of the present invention in a side view;

FIG. 2 shows an embodiment from the front;

FIG. 3 shows a sectional view along line III-III in FIG. 1, and

FIG. 4 shows a sectional view along line IV-IV in FIG. 1.

DETAILED DESCRIPTION OF THE PREFERRED EMBODIMENT

FIG. 1 shows a river 100 in which the apparatus in accordance with the invention is installed. The water level is labeled with reference numeral 101 at normal water level, whereas the water level at high water is labeled with 102. The direction of flow is indicated by arrows 103.

A heavy anchor 1 is inserted into the ground 104 of the river 100, to which the traction means is fastened which is generally designated with reference numeral 2 and which holds the apparatus at the place intended for its purpose. The traction means 2 consists in detail of two anchor cables 2a and a rise-limiting cable 2b. The rise-limiting cable 2b is held by a weight 4 on the ground 104 of the river and is used to limit the rising level of the apparatus. In order to simplify the anchoring, the rise-limiting cable 2b is guided by weight 4 further to the anchor 1 and is also anchored there.

In the position of the apparatus which is shown in FIG. 1 with the unbroken line, the level of the apparatus is determined substantially by the buoyancy, so that the same is arranged directly beneath the water surface 101. The rise-limiting cable 2b comprises a loose section 3.

When the water level 101 rises to a high-water level 102, the apparatus reaches the position as shown in FIG. 1 with the broken lines. The rise-limiting cable 2b is perpendicularly tensioned in this position and limits any further rise of the apparatus. As can be seen from the illustration, the same can assume a slight inclined position because the rise-limiting cable 2b is attached in the upstream section. A predetermined distance d from the water surface 102 is achieved with this measure, which increases with increasing level. Any flotsam entrained on the water surface 102 will therefore not damage the apparatus as long as there are no sections protruding far beneath the water surface.

The apparatus itself consists of an outside housing 6 and an inside housing 7, with the outside housing 6 having a substantially rectangular cross section which expands laterally in the downstream direction. The inside housing 7 is broken down into two flowages 7a, 7b, with a turbine 12 being provided in each of the same on a suspension 13, which turbines drive a generator 14 via a transmission 15. The inlet opening 8 of the inside housing 7 comprises a cross-section 9 which is composed of two adjacently arranged squares. The inside housing 7 is provided with a round configuration in the area of turbine 12 in order to achieve optimal efficiency. A rectangular cross section is achieved at the outlet opening 10.

Admission to turbine 12 occurs in the axial direction and it comprises, depending on the configuration, adjustable or rigid blades 12a. An inlet rake extends from a floating body 5 which stands perpendicularly in the used position on the upstream side of the apparatus to the lateral inlet edges 16a of the housing 6, 7. The rake is composed of profiles 16b arranged in a V-shaped manner which extend in the used position in the horizontal direction above one another from the floating body 5 to the inlet edges 16a. This construction has proven to be especially sturdy and robust and ensures simultaneously that the inflow is obstructed as little as possible. Cavities 17 are provided between the outside housing 6 and the inside housing 7, which cavities can be flooded with water or compressed air in order to set the buoyancy of the apparatus. For this purpose, compressed-air valves 18 and water-filling nozzles 19 are applied. Signaling units 21 can be provided on the additional floating bodies 20 of the apparatus which are usually located above the water surface 101 in order to prevent the apparatus from being run over by ships. Feet 22 are attached to the bottom side of the apparatus which ensure sufficient distance to the ground of the river in the case of extremely low water. Power cables 23 are used for respectively diverting the generated electric power to land. A control device for this apparatus is designated with reference numeral 24.

The apparatus in accordance with the invention allows realizing a utilization in the manner of a power plant in freely flowing non-dammed rivers even when the erection of conventional power plants is not possible for economic or ecological reasons. The economic use of the apparatus merely requires an adequate flow speed and is completely environmentally friendly and is free from any hazardous effects on the environment. The apparatus in accordance with the invention is robust against high water, low water, flotsam, icing, accumulation of ice, clogging with flotsam, accumulation of bed load, shipping with large or sports vessels and vandalism.

The invention claimed is:

1. An apparatus for generating power in freely flowing rivers, comprising
   a housing consisting of an outside housing and a flow housing,
   cavities between the flow housing and said outside housing which can be filled with water or air to stabilize the apparatus beneath the water surface,
   a turbine arranged in the flow housing driving an electrical generator,
   floating bodies on a top side of the outside housing, and
   a traction means for anchoring the apparatus on a bed of the river, said traction means comprising an anchor cable and a rise-limiting cable which is shorter than the anchor cable.

2. The apparatus according to claim 1, wherein the rise-limiting cable extends vertically from the bed of the river to the apparatus and is anchored on the bed of the river by an anchor or a heavy weight.

3. The apparatus according to claim 1, wherein two anchor cables are mounted on a bow of the housing in equal height.

4. The apparatus according to claim 1, wherein the turbine is a slowly revolving turbine.

5. The apparatus according to claim 1, wherein the flow housing has an approximately square inlet adjacent around turbine pipe cylinder and a rectangular outlet with a cross section which increases in a flow direction.

6. The apparatus according to claim 1, wherein the outside housing has a rectangular cross section which is enlarged on a downstream side.

7. The apparatus according to claim 1, wherein the cavities are subdivided in their length and can be filled with water and/or compressed air.

8. The apparatus according to claim 1, wherein a rake is provided at a bow of the housing consisting of a vertical floating body and of V-shaped profiles which are distributed over the entire height of the housing and extend from the vertical floating body to lateral edges of the housing.

9. The apparatus according to claim 1, wherein feet are arranged on a bottom side of the outside housing.

* * * * *